(12) United States Patent
Nogami et al.

(10) Patent No.: US 8,715,554 B2
(45) Date of Patent: May 6, 2014

(54) METHOD FOR MANUFACTURING RESIN FILM FOR THIN FILM-CAPACITOR AND THE FILM THEREFOR

(75) Inventors: Takashi Nogami, Saitama (JP); Kenro Takizawa, Saitama (JP); Kazuhiro Suzuki, Saitama (JP); Junya Ishida, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 142 days.

(21) Appl. No.: 12/980,953

(22) Filed: Dec. 29, 2010

(65) Prior Publication Data

US 2011/0217509 A1    Sep. 8, 2011

(30) Foreign Application Priority Data

Mar. 8, 2010 (JP) .................................. 2010-050624

(51) Int. Cl.
  *B29C 47/14* (2006.01)
(52) U.S. Cl.
  USPC ...................................... 264/169; 264/177.17
(58) Field of Classification Search
  USPC .............................................. 264/169, 177.17
  See application file for complete search history.

(56) References Cited

U.S. PATENT DOCUMENTS

2002/0167111 A1* 11/2002 Tsunekawa et al. ....... 264/210.7

FOREIGN PATENT DOCUMENTS

| JP | 61-272917 A | 12/1986 |
| JP | 2002-124432 A | 4/2002 |
| JP | 2002-141246 A | 5/2002 |
| JP | 2007-300126 A | 11/2007 |
| JP | 2008-274023 A | 11/2008 |
| JP | 2009-152590 A | 7/2009 |
| WO | WO 2005023928 A1 * | 3/2005 |

* cited by examiner

*Primary Examiner* — Larry Thrower
*Assistant Examiner* — Xue Liu
(74) *Attorney, Agent, or Firm* — Arent Fox LLP

(57) ABSTRACT

The present invention provides a resin film for a film capacitor making it possible to obtain the excellent heat resistance, materialize a reduction in a size of the film capacitor and an increase in a capacity thereof and satisfy a reduction in a thickness of the film and a high voltage resistance thereof. In a manufacturing method in which an extruding equipment 10 is charged with a molding material 1 to extrude a film 2 for a film capacitor from a T dice 20, in which the above extruded film 2 for a film capacitor is interposed between plural rolls in a receiving device 30 and cooled and in which the above cooled film 2 for a film capacitor is wound on a winding tube 42 of a winding device 40, 100 parts by mass of a polyetherimide resin is blended with 1 to 10 parts by mass of a fluorocarbon resin to prepare the molding material 1; the above molding material 1 is extruded through a filter 50 having apertures 51 which are 0.5 to 6 times or less as large as an average thickness of the film 2 for a film capacitor, which is provided between the extruding equipment 10 and the T dice 20; and a thickness of the film 2 for a film capacitor is controlled to 10 μm or less.

1 Claim, 2 Drawing Sheets

METHOD FOR MANUFACTURING RESIN FILM FOR THIN FILM-CAPACITOR AND THE FILM THEREFOR

This Nonprovisional application claims priority under 35 U.S.C. §119(a) on Patent Application No. 2010-50624 filed in Japan on 8 Mar. 2010, the entire contents of which are hereby incorporated by reference.

BACKGROUND OF THE INVENTION AND RELATED ART STATEMENT (1) Field of the Invention The present invention relates to a method for manufacturing a film for a film capacitor which has a low dielectric loss and to which a voltage resistance and a heat resistance are required and a film for a film capacitor.

(2) Description of the Prior Art

Conventional film capacitors are constituted, though not illustrated, by using a film made of polyester as a dielectric layer and forming thereon a metal deposition layer as an electrode, and they are used for electronic parts and the like (refer to patent documents 1, 2 and 3).

On the other hand, in recent years, hybrid cars having a low environmental load have been developed and produced, and they have started becoming widely used. However, when a film capacitor is used as an electronic part for the above hybrid cars, it is used under an environment of high temperature (for example, 150° C. or higher), and therefore it is required to have an excellent heat resistance.

CROSS-REFERENCE TO RELATED APPLICATIONS

Patent document 1: Japanese Patent Application Laid-Open No. 152590/2009
Patent document 2: Japanese Patent Application Laid-Open No. 300126/2007
Patent document 3: Japanese Patent Application Laid-Open No. 141246/2002

SUMMARY OF THE INVENTION

Conventional film capacitors are constituted as described above, and when they are used as an electronic part for the hybrid cars, they are requested to have an excellent heat resistance. Further, a reduction in a size of film capacitors themselves and an increase in a capacity thereof are increasingly requested, and in addition thereto, a further reduction in a thickness of a film which functions as a dielectric layer and a high voltage resistance thereof have come to be strongly requested.

The present invention has been made in light of the problems described above, and an object thereof is to provide a method for manufacturing a film for a film capacitor making it possible to obtain the excellent heat resistance, materialize a reduction in a size of the film capacitor and an increase in a capacity thereof and satisfy a reduction in a thickness of the film and a high voltage resistance thereof and to provide as well a film for a film capacitor.

In order to solve the problems described above, the present invention is characterized by a method for manufacturing a film for a film capacitor comprising the steps of charging an extruding equipment with a molding material to extrude a film for a film capacitor from an extruding dice and interposing the above extruded film for a film capacitor between plural rolls to cool it, wherein the molding material is prepared by blending 100 parts by mass of at least a polyetherimide resin with 1 to 10 parts by mass of a fluorocarbon resin; a filter having apertures which are 0.5 to 6 times or less as large as an average thickness of the extruded film for a film capacitor is provided between the extruding equipment and the extruding dice; and a thickness of the film for a film capacitor is controlled to 10 μm or less.

In an apparatus for manufacturing the film for a film capacitor in which the extruding equipment is charged with the molding material prepared by blending 100 parts by mass of at least the polyetherimide resin with 1 to 10 parts by mass of the fluorocarbon resin to extrude the film for a film capacitor from the extruding dice, the filter having apertures which are 0.5 to 6 times or less as large as an average thickness of the film for a film capacitor can be provided between the extruding equipment and the extruding dice.

In this regard, the molding material falling in a range of the claims is prepared preferably by blending the polyetherimide resin only with the fluorocarbon resin from the viewpoint of obtaining an excellent heat resistance, and various fillers such as silica and the like can suitably be added to them as long as specific troubles are not brought about. The extruding equipment may be either a single shaft type or a double shaft type. Further, the film for a film capacitor according to the present invention can be used at least for inverters and the like in hybrid cars, wind power generation and solar power generation.

According to the present invention, the polyetherimide resin which is excellent in a heat resistance is used instead of polyester, polypropylene or polyethylene terephthalate as the molding material, and therefore the heat resistance which is endurable under high temperature environment can be obtained. The film for a film capacitor is molded in a thickness of 10 μm or less, and therefore it becomes possible to satisfy requirements to a reduction in a size of the film capacitor itself and an increase in a capacity thereof and reduce a thickness of the film for a film capacitor. Further, since the filter has apertures which are 0.5 to 6 times or less as large as an average thickness of the film for a film capacitor, the fluorocarbon resin contained in the molding material can be dispersed well to enhance the voltage resistance and the like, and in addition thereto, foreign matters contained in the molding material can be removed.

According to the present invention, the effects that the excellent heat resistance can be obtained and that a reduction in a size of the film capacitor and an increase in a capacity thereof can be materialized are obtained. Further, a reduction in a thickness of the film for a film capacitor and a high voltage resistance thereof can be satisfied.

DESCRIPTION OF THE PREFERRED EMBODIMENTS

Figure 1:
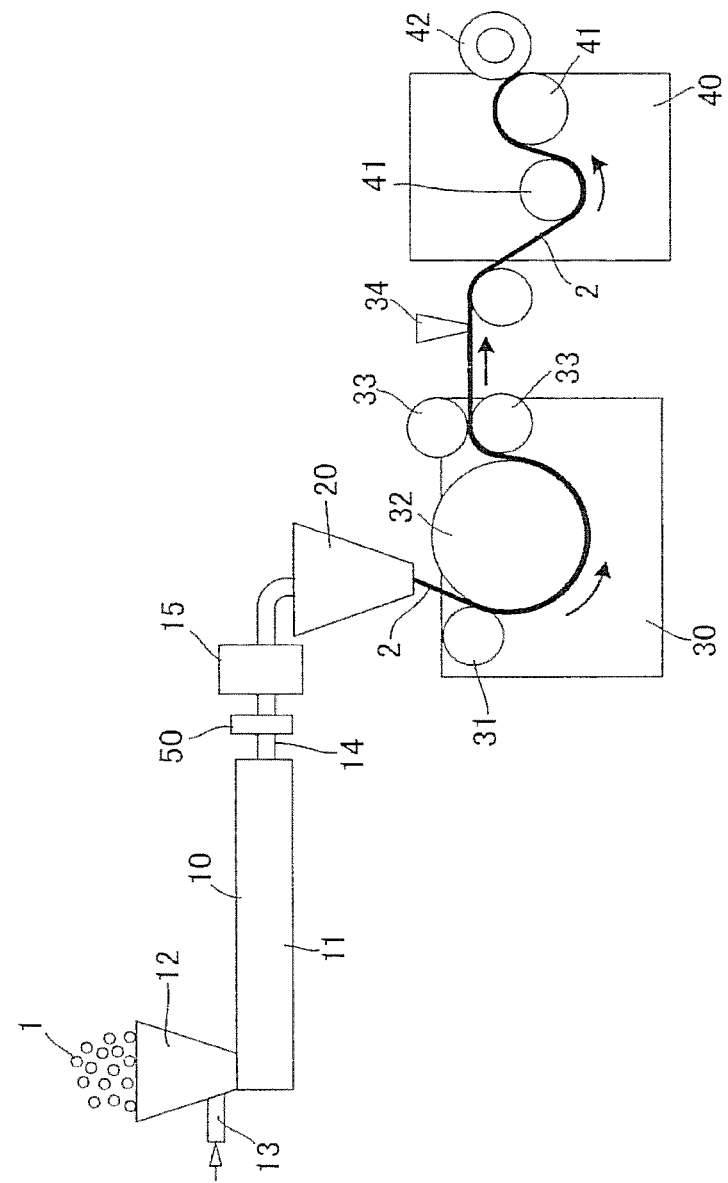
FIG. 1 is an overall explanatory drawing schematically showing the embodiments of the method for manufacturing a film for a film capacitor and the film for a film capacitor according to the present invention.
Figure 2:
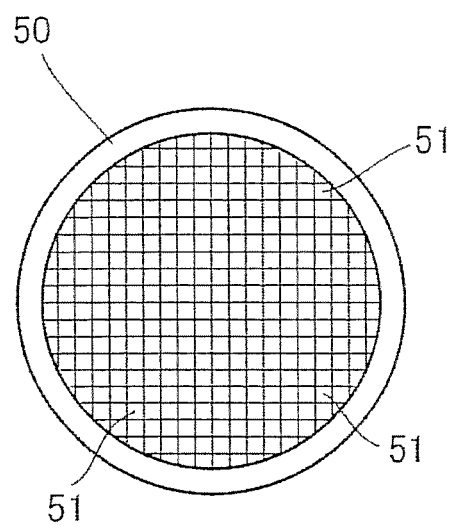
FIG. 2 is an explanatory drawing schematically showing the filter in the embodiment of the method for manufacturing a film for a film capacitor according to the present invention.

The embodiments of the present invention shall be explained below with reference to the drawings. The method for manufacturing a film for a film capacitor in the present embodiment is a manufacturing method in which, as shown in FIG. 1 and FIG. 2, an extruding equipment 10 is charged with a molding material 1 to extrude a film 2 for a film capacitor from a T dice 20, in which, the above extruded film 2 for a film capacitor is interposed in a receiving device 30 and cooled and in which the above cooled film 2 for a film capacitor is wound on a winding device 40. The molding material 1 is prepared by blending a polyetherimide resin with a fluorocarbon resin; a filter 50 having apertures 51 which are 6 times or less as large as an average thickness of the film 2 for a film capacitor is provided between the extruding equipment 10 and the extruding dice 20; and a thickness of the film 2 for a film capacitor is controlled to 10 μm or less.

The molding material 1 is prepared by blending 100 parts by mass of the polyetherimide resin which is excellent in a heat resistance of 150° C. or higher with 1 to 10 parts by mass, preferably 5 parts by mass of the fluorocarbon resin which provides a sliding property. The polyetherimide resin and the fluorocarbon resin in the molding material 1 are mixed by stirring, kneaded by means of an extrusion kneading equipment, subjected to drying treatment and then put into the extruding equipment 10. The fluorocarbon resin provides the film for a film capacitor with a sliding property and a slipping property to contribute to manufacturing it, but it is a factor to bring about a reduction in the voltage resistant characteristic.

In the extruding equipment 10, a screw equipped with spiral grooves is rotatably mounted in a horizontally long cylinder 11 to be heated, and the above screw is rotated by driving of a driving device and functions so that the molding material 1 added is molten and kneaded and supplied to the T dice 20 at a tip part side. A delivering hopper 12 for the molding material 1 is installed at an upper side of an end part in the cylinder 11 so that it is communicated therewith, and an inert gas-supplying tube 13 for continuously supplying an inert gas such as a nitrogen gas and the like is connected with a lower part of the hopper 12 communicated at least with the cylinder 11 from the viewpoint of preventing oxidation and deterioration of the molding material 1.

A connecting tube 14 to be heated is connected with an opened tip part of the cylinder 11, and a filter 50 for filtration is mounted to the above connecting tube 14. A gear pump 15 for extruding the molding material 1 at a constant speed is installed in a downstream position of the above filter 50.

The T dice 20 is connected with a tip part of the connecting tube 14 bent to a lower side and functions so as to spread the molding material 1 supplied from the gear pump 15 of the extruding equipment 10 to a width direction and extrude the above molding material 1 from an elongated clearance thereof to extrude and mold the film 2 for a film capacitor.

In a receiving equipment 30, a rotatable small pressing roll 31 and a rotatable large cooling roll 32 which interpose therebetween the film 2 for a film capacitor extruded from the T dice 20 to a lower side while pressing are oppositely disposed, and a pair of upper and lower carrying rolls 33 for controlling curling while interposing and cooling the film 2 for a film capacitor are rotatably disposed in a downstream of the above cooling roll 32. A thickness-measuring device 34 for measuring a thickness of the film 2 for a film capacitor is provided in a downstream of a pair of the above upper and lower carrying rolls 33.

Plural rolls 41 for delivering the film 2 for a film capacitor supplied from the receiving equipment 30 are rotatably disposed at a prescribed interval in a winding equipment 40, and a winding tube 42 for winding the film 2 for a film capacitor is rotatably disposed in a downstream of the above plural rolls 41.

The filter 50 comprises, as shown in FIG. 1 and FIG. 2, a disc provided concentrically with a lot of pores, sintered metal having many pores, a metal-made mesh or the like and has a plurality of small apertures 51 which are 0.5 to 6 times or less, preferably 0.5 to 4 times or less and more preferably 0.5 to 3.8 times or less as large as an average thickness of the film 2 for a film capacitor, and it is provided between the extruding equipment 10 and the gear pump 15.

The apertures 51 of the filter 50 are 0.5 time as large as an average thickness of the film 2 for a film capacitor because of the reasons that since an extrusion pressure of the molding material 1 is increased if the apertures are less than 0.5 time as large as an average thickness thereof, the filter 50 is liable to be damaged and that the voltage resistance is likely to be reduced. Further, it is because the productivity is notably reduced.

Plural discs of the filter 50, meshes and the like are selectively laminated and used if necessary. Also, it does not matter that a form of the apertures 51 in the filter 50 is circular, elliptical, rectangular, perpendicular or polygonal. The above filter 50 highly disperses the fluorocarbon resin in the molding material 1 flowing through the connecting tube 14, removes foreign matters, gelated matters and the like contained in the molten molding material 1 or elevates a back pressure in the cylinder 11 to increase a kneading effect of the molding material 1.

When producing the film 2 for a film capacitor in the case described above, the slightly viscous polyetherimide resin and the fluorocarbon resin which are weighed are stirred and mixed to prepare a mixture, and this mixture is kneaded by means of an extrusion kneading equipment to prepare a resin composition having a pellet form. The above resin composition is subjected to drying treatment to reduce a moisture content, whereby the molding material 1 is prepared.

The molding material 1 thus prepared is put into the delivering hopper 12 of the extruding equipment 10 shown in FIG. 1 while supplying an inert gas, and the molding material is extruded by the extruding equipment 10 and filtrated through the filter 50. The film 2 for a film capacitor is continuously extruded from the heated T dice 20 and molded, and this film 2 for a film capacitor is interposed between the pressing roll 31 and the cooling roll 32 in the receiving equipment 30 and solidified by cooling, whereby a thickness thereof is controlled to 10 μm or less, preferably 5 to 7 μm. The above film 2 for a film capacitor is wound in order on the receiving tube 42 of the winding device 40 positioned in a downstream, whereby the film 2 for a film capacitor can be produced.

In the above case, the aperture 51 of the filter 50 is set in advance to a size which is 0.5 to 6 times or less as large as an average thickness of the film 2 for a film capacitor, and the fluorocarbon resin which provides the film 2 for a film capacitor with a sliding property is suitably dispersed in the molding material 1 to enhance the productivity. Further, foreign matters can be removed more effectively than ever. Also, the film 2 for a film capacitor which is wound is set in a deposition equipment which is not illustrated later, and patterns are formed in a stripe form on the metal deposition layer via a slit part.

According to the foregoing, the polyetherimide resin which is excellent in a heat resistance is used instead of polyester as the molding material 1, and therefore also when the film capacitor is used as an electronic part for hybrid cars, the excellent heat resistance of 150° C. or higher can readily be secured. Further, the film 2 for a film capacitor can be molded in a thickness of 10 μm or less by specifying the molding material 1 without using a stretching equipment, and therefore it becomes possible to satisfy requirements to a reduction in a size of the film capacitor itself and an increase in a capacity thereof, omit a related cooling device for a film capacitor and further reduce a thickness of the film 2 for a film capacitor.

Further, the filter 50 have the narrow apertures 51 which are 0.5 to 6 times or less as large as an average thickness of the film 2 for a film capacitor, and therefore the fluorocarbon resin which is considered to bring about a reduction in the voltage resistance is not turned into foreign matters and can suitably be dispersed to notably enhance the voltage resistance. In particular, a reduction thereof in a part where a dielectric breakdown voltage value of the film 2 for a film capacitor is extremely low can be expected to a large extent.

In the embodiment described above, the inert gas-supplying tube 13 is connected to a lower part of the delivering hopper 12 communicating with the cylinder 11, and the inert gas-supplying tubes 13 may be connected respectively to upper and lower parts of the delivering hopper 12 to prevent surely generation of die lines, oxidation and the like. Also, the single filter 50 is connected with the connecting tube 14 in the extruding equipment 10, and the plural filters 50 may be installed. Further, the film 2 for a film capacitor is simply wound, and it may be subjected to biaxial stretching treatment after wound as long as troubles are brought about on the sliding property and the like.

EXAMPLES

Next, the examples of the present invention shall be explained together with comparative examples.

Example 1

First, 100 parts by mass of a weighed polyetherimide resin was mixed with 5 parts by mass of a fluorocarbon resin while stirring to prepare a mixture, and this mixture was kneaded by means of a double shaft extrusion kneading equipment to prepare a pelletized resin composition.

Ultem 1010 (trade name: manufactured by Innovative Plastics Holding IP BV) was used as the polyetherimide resin, and Fluon PFA P-62XP (trade name: manufactured by Asahi Glass Co., Ltd.) was used as the fluorocarbon resin. Also, PCM30 (trade name: manufactured by IKEGAI Corporation) was used as the double shaft extrusion kneading equipment, and the mixture was kneaded on the conditions of a cylinder temperature of 320 to 350° C., a connecting tube temperature of 360° C. and a dice temperature of 360° C.

After preparing the resin composition, the above resin composition was left standing for 24 hours in a hot air dryer equipped with an exhaust port which was heated at 160° C. and subjected to drying treatment, and it was confirmed that a moisture content of the resin composition was 300 ppm or less to prepare a molding material.

Next, the molding material was put into a delivering hopper of a single shaft extruding equipment of Φ40 mm shown in FIG. 1, and the molding material was extruded by the above extruding equipment and filtrated through a filter to mold a film for a film capacitor by continuously extruding it from a heated T dice. The above film for a film capacitor was interposed between a pressing roll and a cooling roll in a receiving equipment and solidified by cooling to thereby control an average thickness thereof to 4.86 μm.

MVS40-25 (trade name, manufactured by IKG Corporation) was used for the single shaft extruding equipment to extrude the molding material on the conditions of a cylinder temperature of 330 to 350° C., a screw revolution of 30 rpm, a connecting tube temperature of 360° C. and a T dice temperature of 360° C.

A metal mesh having an aperture of 26 μm and a specification of 500# was used for the filter, and the aperture was set to 5.3 times as large as an average thickness of the film for a film capacitor.

After manufacturing the film for a film capacitor having an average thickness of 4.86 μm in a band form, a prescribed voltage was applied in order on vertical and horizontal 95 points (5×19) of the film for a film capacitor in order to confirm a voltage resistance of the above film for a film capacitor, whereby a voltage resistance thereof was tested, and the test results thereof were summarized in Table 1.

Example 2

A film for a film capacitor was manufactured fundamentally in the same manner as in Example 1, and the film for a film capacitor was manufactured in an average thickness of 6.72 μm. Also, a metal mesh having an aperture of 26 μm and a specification of 500# was used for the filter, and the aperture was set to 3.9 times as large as an average thickness of the film for a film capacitor.

Example 3

A film for a film capacitor was manufactured in fundamentally the same manner as in Example 1, and the film for a film capacitor was manufactured in an average thickness of 3.44 μm. Also, Dena Filter (material: stainless steel (SUS 316L, 304 grades), trade name: manufactured by Nagase & Co., Ltd.) having an aperture (filtering accuracy) of 20 μm was used for the filter, and the aperture was set to 5.8 times as large as an average thickness of the film for a film capacitor.

Example 4

A film for a film capacitor was manufactured fundamentally in the same manner as in Example 1, and the film for a film capacitor was manufactured in an average thickness of 4.98 μm. Also, Dena Filter (trade name: manufactured by Nagase & Co., Ltd.) having an aperture of 20 μm was used for the filter, and the aperture was set to 4.0 times as large as an average thickness of the film for a film capacitor.

Example 5

A film for a film capacitor was manufactured in fundamentally the same manner as in Example 1, and the film for a film capacitor was manufactured in an average thickness of 6.85 μm. Also, Dena Filter (trade name: manufactured by Nagase & Co., Ltd.) having an aperture of 20 μm was used for the filter, and the aperture was set to 2.9 times as large as an average thickness of the film for a film capacitor.

Example 6

A film for a film capacitor was manufactured fundamentally in the same manner as in Example 1, and the film for a film capacitor was manufactured in an average thickness of 3.07 μm. Also, Dena Filter (trade name: manufactured by Nagase & Co., Ltd.) having an aperture (filtering accuracy) of 5 μm was used for the filter, and the aperture was set to 1.6 time as large as an average thickness of the film for a film capacitor.

Example 7

A film for a film capacitor was manufactured fundamentally in the same manner as in Example 1, and the film for a film capacitor was manufactured in an average thickness of 4.94 μm. Also, Dena Filter (trade name: manufactured by Nagase & Co., Ltd.) having an aperture of 5 μm was used for the filter, and the aperture was set to 1.0 time as large as an average thickness of the film for a film capacitor.

Example 8

A film for a film capacitor was manufactured fundamentally in the same manner as in Example 1, and the film for a film capacitor was manufactured in an average thickness of 5.91 μm. Also, Dena Filter (trade name: manufactured by Nagase & Co., Ltd.) having an aperture of 5 μm was used for the filter, and the aperture was set to 0.8 time as large as an average thickness of the film for a film capacitor.

Comparative Example 1

The present comparative example was fundamentally the same as Example 1, and a film for a film capacitor was manufactured in an average thickness of 4.88 μm without mixing the polyetherimide resin with the fluorocarbon resin. Also, a metal mesh having an aperture of 65 μm and a specification of 200# was used for the filter, and the aperture was changed to 13.3 times which was 6 times or more as large as an average thickness of the film for a film capacitor.

Comparative Example 2

The present comparative example was fundamentally the same as Example 1, and a film for a film capacitor was manufactured in an average thickness of 4.89 μm without mixing the polyetherimide resin with the fluorocarbon resin. Also, a metal mesh having an aperture of 26 μm and a specification of 500# was used for the filter, and the aperture was changed to 5.3 times as large as an average thickness of the film for a film capacitor.

Comparative Example 3

The present comparative example was fundamentally the same as Example 1, and a film for a film capacitor was manufactured in an average thickness of 4.91 μm without mixing the polyetherimide resin with the fluorocarbon resin. Also, Dena Filter (trade name: manufactured by Nagase & Co., Ltd.) having an aperture (filtering accuracy) of 20 μm was used for the filter, and the aperture was changed to 4.1 times as large as an average thickness of the film for a film capacitor.

Comparative Example 4

The present comparative example was fundamentally the same as Example 1, and a film for a film capacitor was manufactured in an average thickness of 4.95 μm without mixing the polyetherimide resin with the fluorocarbon resin. Also, Dena Filter (trade name: manufactured by Nagase & Co., Ltd.) having an aperture (filtering accuracy) of 5 μm was used for the filter, and the aperture was changed to 1.0 time as large as an average thickness of the film for a film capacitor.

Comparative Example 5

The present comparative example was fundamentally the same as Example 1, and a film for a film capacitor was manufactured in an average thickness of 5.01 μm. However, a metal mesh having an aperture of 65 μm and a specification of 200# was used for the filter, and the aperture was changed to 13.0 times as large as an average thickness of the film for a film capacitor.

Comparative Example 6

The present comparative example was fundamentally the same as Example 1, and a film for a film capacitor was manufactured in an average thickness of 2.89 μm. However, a metal mesh having an aperture of 65 μm and a specification of 200# was used for the filter, and the aperture was changed to 9.0 times as large as an average thickness of the film for a film capacitor.

TABLE 1

| | Material composition | | Filter | | | Thickness ($\mu$m) average | Aperture/ thickness | Voltage resistance (V/$\mu$m) N number: 95 (5 × 19) (dielectric breakdown voltage/thickness) Ave. |
|---|---|---|---|---|---|---|---|---|
| | Polyetherimide resin Ultem 1010 | Fluoro-carbon resin Fluon PFA P-62XP | Name | Specification | Aperture | | | |
| Comparative Example 1 | 100 parts by mass | 0 part by mass | Metal mesh | #200 | 65 μm☐ | 4.88 | 13.3 | 288 |
| Comparative Example 2 | | | Metal mesh | #500 | 26 μm☐ | 4.89 | 5.3 | 298 |
| Comparative Example 3 | | | Dena Filter | Filtering accuracy: 20 μm | | 4.91 | 4.1 | 303 |
| Comparative Example 4 | | | Dena Filter | Filtering accuracy: 5 μm | | 4.95 | 1.0 | 317 |
| Comparative Example 5 | 100 parts by mass | 5 parts by mass | Metal mesh | #200 | 65 μm☐ | 5.01 | 13.0 | 206 |
| Comparative Example 6 | | | Metal mesh | #500 | 26 μm☐ | 2.89 | 9.0 | 222 |
| Example 1 | | | | | | 4.86 | 5.3 | 268 |
| Example 2 | | | | | | 6.72 | 3.9 | 283 |
| Example 3 | | | Dena Filter | Filtering accuracy: 20 μm | | 3.44 | 5.8 | 274 |
| Example 4 | | | | | | 4.98 | 4.0 | 290 |
| Example 5 | | | | | | 6.85 | 2.9 | 295 |
| Example 6 | | | Dena Filter | Filtering accuracy: 5 μm | | 3.07 | 1.6 | 308 |
| Example 7 | | | | | | 4.94 | 1.0 | 302 |
| Example 8 | | | | | | 5.91 | 0.8 | 309 |

TABLE 1-continued

|  | Voltage resistance (V/μm) N number: 95 (5 × 19) (dielectric breakdown voltage/thickness) | | | | | | |
|---|---|---|---|---|---|---|---|
|  | Max. | Min. | Defect number of 100 V/μm or less | Defect number of 150 V/μm or less | Defect number of 200 V/μm or less | Defect number of 250 V/μm or less | Defect number of 300 V/μm or less |
| Comparative Example 1 | 381 | 217 | 0/95 | 0/95 | 0/95 | 15/95 | 47/95 |
| Comparative Example 2 | 394 | 206 | 0/95 | 0/95 | 0/95 | 19/95 | 40/95 |
| Comparative Example 3 | 384 | 211 | 0/95 | 0/95 | 0/95 | 14/95 | 33/95 |
| Comparative Example 4 | 384 | 222 | 0/95 | 0/95 | 0/95 | 13/95 | 27/95 |
| Comparative Example 5 | 322 | 48 | 8/95 | 15/95 | 45/95 | 52/95 | 75/95 |
| Comparative Example 6 | 318 | 105 | 0/95 | 12/95 | 31/95 | 58/95 | 74/95 |
| Example 1 | 368 | 185 | 0/95 | 0/95 | 2/95 | 40/95 | 63/95 |
| Example 2 | 361 | 201 | 0/95 | 0/95 | 0/95 | 27/95 | 49/95 |
| Example 3 | 345 | 175 | 0/95 | 0/95 | 4/95 | 45/95 | 71/95 |
| Example 4 | 356 | 217 | 0/95 | 0/95 | 0/95 | 11/95 | 57/95 |
| Example 5 | 361 | 213 | 0/95 | 0/95 | 0/95 | 8/95 | 51/95 |
| Example 6 | 357 | 202 | 0/95 | 0/95 | 0/95 | 10/95 | 44/95 |
| Example 7 | 360 | 209 | 0/95 | 0/95 | 0/95 | 10/95 | 43/95 |
| Example 8 | 371 | 214 | 0/95 | 0/95 | 0/95 | 4/95 | 25/95 |

In the cases of the films for a film capacitor prepared in Examples 1 to 4, the good test results in which the defect numbers were small unlike the comparative examples could be obtained, and parts in which a dielectric breakdown voltage value of the film for a film capacitor was extremely low were reduced.

What is claimed is:

1. A method for manufacturing a film for a film capacitor comprising the steps of:

charging an extruding equipment with a molding material to extrude a film for a film capacitor from an extruding dice and interposing the extruded film between plural rolls to cool the extruded film, wherein:

100 parts by mass of at least a polyetherimide resin is blended with 1 to 10 parts by mass of a fluorocarbon resin to prepare the molding material;

the molding material is extruded through a filter having apertures which are 0.5 to 6 times or less as large as an average thickness of the extruded film, the filter being provided between the extruding equipment and the extruding dice;

the thickness of the extruded film is controlled to 10 μm or less; and the method excludes biaxial stretching.

* * * * *